May 22, 1956 C. B. JOHNSON 2,746,478

PLUG VALVES

Original Filed March 11, 1949

INVENTOR

CHARLES B. JOHNSON

BY Strauch, Nolan & Diggins

ATTORNEYS 2,746,478
Patented May 22, 1956

2,746,478

PLUG VALVES

Charles B. Johnson, Pittsburgh, Pa., assignor to Rockwell Manufacturing Company, Pittsburgh, Pa., a corporation of Pennsylvania Original application March 11, 1949, Serial No. 80,969. Divided and this application March 15, 1951, Serial No. 215,710

5 Claims. (Cl. 137—246.16)

This invention relates to plug valves and is particularly concerned with novel stop and locking devices therefor.

This application is a division of application Serial No. 80,969, filed March 11, 1949 for Closed Bottom Service Cock, now United States Letters Patent No. 2,699,918 issued January 18, 1955.

It is a primary object of the present invention to provide a novel valve plug rotation stop control which is of simple design, positive in operation, and which may be inexpensively manufactured and installed.

It is a further object to provide a novel valve plug rotation limiting and associated locking means which in its assembled position permits adjustment or removal of the valve sealing structure.

It is also an object to provide a novel position locking assembly for a valve which additionally locks the valve lubricating means.

It is a more specific object to provide a novel locking means for a valve constructed and arranged to occupy two positions with respect to the valve stem, one of the positions locking the valve in its open position and the other position locking the valve in its closed position.

Further objects of the invention will appear as the description proceeds in conjunction with the appended claims and the annexed drawings wherein:

Figures 1, 2, 3, 4, 5:
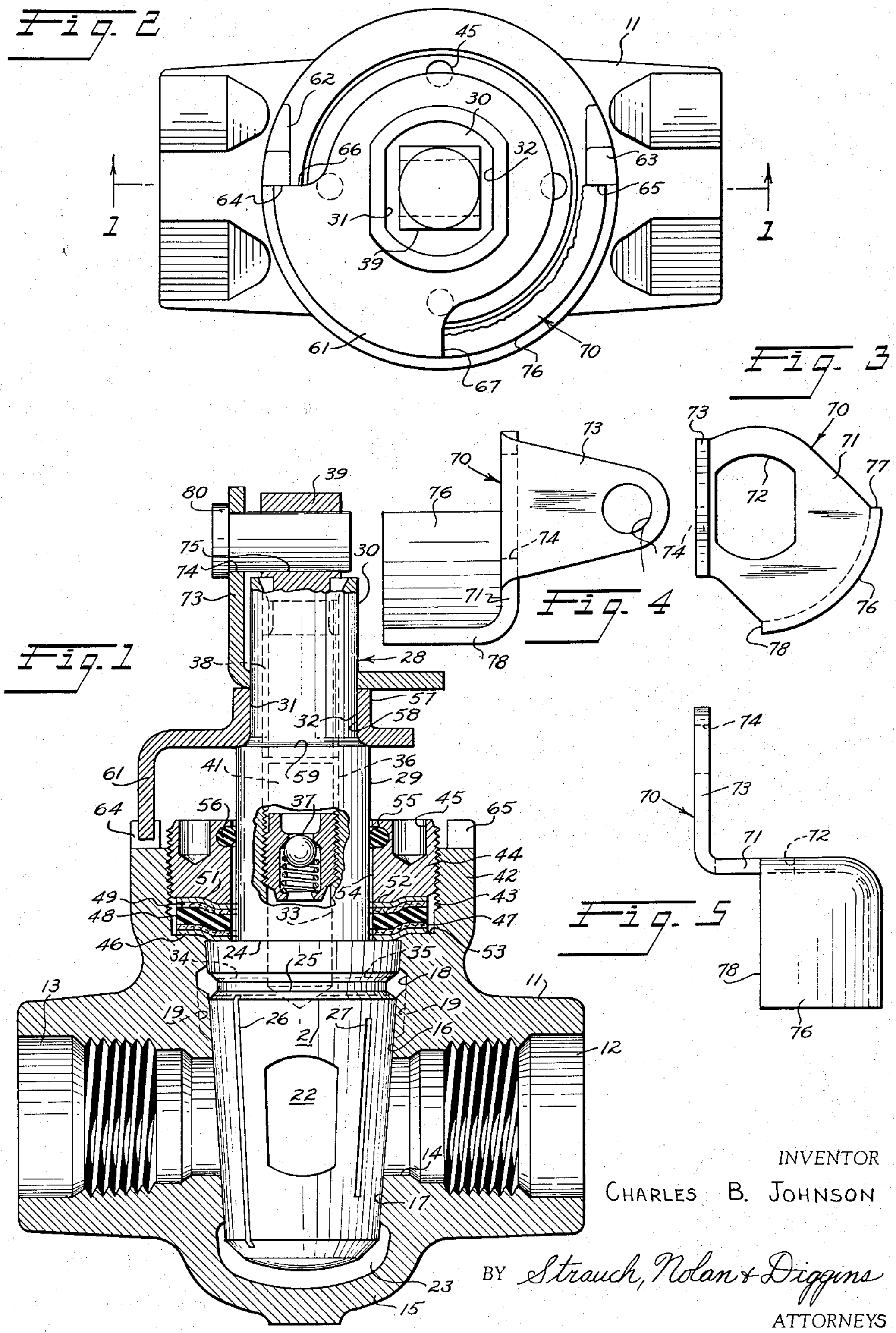
Figure 1 is a vertical sectional view of a valve body and plug assembly illustrating details of a preferred embodiment of the invention taken along line 1—1 of Figure 2.
Figure 2 is a top plan view of the plug valve assembly.
Figure 3 is a top plan view of the locking device associated with the stop collar.
Figure 4 is a side elevation of the locking device as viewed from the left of Figure 3.
Figure 5 is a front elevation of the locking device of Figure 3.

A plug valve body casing is formed at opposite sides with aligned inlet and outlet openings 12 and 13 communicating with a through port 14 to thereby provide a through passage across the valve body. The bottom of the valve body casing is closed by an integral dome-shaped wall 15.

A tapered valve seat bore comprising a machined upper frusto-conical valve seat portion 16 and a machined lower frusto-conical valve seat portion 17 is provided within the body with its normally vertical axis at right angles to the axis of flow through port 14. Seat portion 16 is formed with a continuous annular shallow surface groove 18 above port 14 but below the upper edge of seat portion 16. Four 90 degrees spaced longitudinal dwarf grooves 19 are cut into the surface of the valve seat portion 16 with their upper ends opening into groove 18 and their lower ends terminating short of port 14. Grooves 18 and 19 provide the only interruptions to the surface of frusto-conical seat portion 16 which is otherwise smooth.

A frusto-conical valve plug 21 having a transverse port 22 adapted to align with the casing port 14, but shown in closed position in Figure 1, is rotatably mounted in the tapered bore provided by seats 16 and 17, and its lower end projects into a lubricant receiving chamber 23 provided by wall 15. The upper edge 24 of the plug 21 is preferably sharply cornered, and it terminates a small distance below the upper edge of the valve seat 16 as illustrated in Figure 1.

Valve plug 21 is formed with a continuous annular surface groove 25 in constant communication with continuous seat groove 18, and the side surfaces of the valve plug are formed with 180 degrees spaced pairs of longitudinal grooves 26 and 27. The pair of longer grooves 26 run the length of the plug surface and are diametrically opposite and located alongside the openings of port 22. Grooves 26 are in constant communication at all times at opposite ends with groove 25 and the chamber 23. The pair of shorter grooves 27 terminate short of the groove 25 at their upper ends and short of the lower edge of seat 17 at their lower ends, and when the valve plug is in the closed position of Figure 1 these grooves 27 are in communication with the lubricant circuit of the valve through two of the dwarf grooves 19. When the valve plug 21 has been turned to its 90° open position, the short grooves 27 are in communication with groove 25 through the other pair of dwarf grooves 19.

Upstanding from plug 21 is an integral stem 28 which is formed above plug edge 24 with a cylindrical portion 29 adapted to be surrounded by a seal assembly to be described below, and above portion 29 the valve stem is formed with a reduced extension 30 having two parallel flat sides 31 and 32 as illustrated in Figure 2. Internally, stem 28 is formed with an axial bore 33 that extends into the plug below the level of groove 25, and passageways 34 and 35 are provided for connecting the bottom of bore 33 with groove 25 so as to provide for a constantly open lubricant passage from the stem bore to the external grooving of the plug.

Bore 33 extends the entire length of stem 28 and opens outwardly at the top of the latter. Bore 33 is threaded as at 36 to receive a removable check valve assembly 37, and above the check valve assembly a suitable lubricant screw 38 having an external large operating head 39 is mounted in threaded bore section 36. Between the check valve and the lower end of screw 38 is a reservoir chamber 41 that contains the lubricant which is usually introduced in stick form through the open top of bore 33 and then forced down into and through check valve 37 by inserting and turning down screw 38. Preferably check valve 37 is screwed into bore 33 from above until its threads jam and it is permanently fixed at the bottom of threaded bore section 36.

Lubricant forced down through the check valve assembly and bore 33 enters passages 34 and 35 and grooves 18 and 25 from which it spreads to form a continuous seal over the seating surface 16 on the valve. Lubricant is conducted by grooves 26 and 27 to lower seat 17 and chamber 23. When the valve is in either closed or open positions lubricant may pass under pressure down the grooves 26 to the chamber 23 so that, should the valve be frozen in such position, adequate rotation of screw 38 will exert hydraulic pressure acting upwardly of the plug and sufficient to separate the plug from the seat to permit rotation. The groove and seat arrangement insures that port 22 at opposite ends is surrounded by continuous plastic sealing films of lubricant.

Upstanding from the valve body casing is an integral hollow boss 42 which is internally threaded at 43 for the reception of a metal gland 44 having suitable wrench holes 45. The inner chamber of gland 44 is slightly larger than the outside diameter of stem portion 29 so that these parts may be readily relatively rotated without binding.

Below gland 44 is an axially deformable sealing assembly made up of a stack of annular elements comprising in order, a sheet metal, preferably stainless steel, flat annular diaphragm 46 that seats on the valve body, a flat annular gasket 47 which is preferably of asbestos or some similar composition that is resistant to acids and the fluids and material likely to be encountered in operation of the valve, a somewhat more compressible and thicker annular rubber or like resilient gasket 48, a second asbestos or like composition gasket 49 and another sheet metal annular diaphragm 51 similar to diaphragm 46. The lower end of annular gland 44 is formed near its inner periphery with an annular axially depending projecting rim 52 which engages upper metal diaphragm 51 and functions in the assembly to uniformly axially deform the inner part of the seal stack when gland 44 is drawn tight as illustrated in Figure 1, to thereby provide tight engagement of the inner portion of the flexible seal assembly provided by the stack of washers but one which readily permits relative rotation of the valve plug in the body. The gland 44 thereby shapes and conforms the seal assembly to the joint to be sealed and provides equal sealing pressure all around the plug top which aids in properly seating the plug in its bore. The outer peripheral portion of the seal stack is squeezed tightly and immovably between gland 44 and the body ledge 53 whereby a tight leak proof seal is provided at this point. By providing an axially flexible seal, I eliminate any need to align the flat plug and body surfaces at 24 and 53.

In order to prevent ingress of water, dirt and other undesirable substances between the valve stem and the inner cylindrical periphery 54 of gland 44, I form the gland surface 54 near its upper end with a continuous annular recess 55 which is substantially cylindrical in cross section but of a depth slightly less than its diameter for the reception of a sealing member that preferably comprises a deformable and resilient, preferably synthetic oil-resistant rubber, O-ring 56 that is cylindrical in undeformed cross section. The inner diameter of the undeformed O-ring 56 is just enough smaller than valve stem portion 29 that it will fit over and slide along cylindrical portion 29 while being slightly radially deformed thereby with the result that its inner side is substantially flattened against cylindrical surface portion 29 of the valve stem. This engagement of the O-ring with the valve stem will not interfere with longitudinal movement of the gland as the latter is tightened against the seal stack, and the gland to stem seal is preserved during tightening of the gland. In assembling the valve, with the plug seated, it is only necessary to drop the seal stack in place and tighten up gland 44. The thickness of the seal stack prevents axial binding of the plug.

A stop collar element 57, which is preferably an inexpensive sheet metal stamping with its bore 58 formed to be press fitted over the flat-sided reduced portion 30 of the valve stem and to seat at its lower end on the shoulder 59 provided between the valve stem portions 29 and 30, is formed with a depending flange 61 which has an extent circumferentially equal to about 90 degrees as illustrated in Figure 1. The upper edge of body 42 is formed with integral projections 62 and 63 formed with radial faces 64 and 65 respectively adapted to be contacted by either of faces 66 or 67 respectively at opposite ends of the flange 61 and thereby serve as positive stops 180° apart limiting rotation of the valve plug between 90 degrees displaced fully open and fully closed positions. It is an important part of the assembly of the invention that the gland 44 may be tightened or removed without disturbing collar 57.

Figures 3, 4 and 5 illustrate a preferred locking device 70 that may be used to seal the valve plug in open or closed position. This device is preferably an inexpensive sheet metal stamping having a transverse web 71 formed with an aperture 72 adapted to be non-rotatably slip-fitted onto upper stem portion 30 above collar 57, an upstanding integral ear 73 apertured at 74 for alignment with a hole 75 in the head of screw 38, and a depending integral skirt 76 having radial stop faces 77 and 78 90 degrees apart.

Once the valve is assembled, it may be locked in the Figure 1 position by slipping locking device 70 over the valve stem down onto the top of collar 57 and so that faces 77 and 78 are disposed between stop faces 65 and 67. A suitable locking device such as seal plug 80 or a padlock is passed through apertures 74 and 75 which are then in alignment, and the valve cannot be operated without breaking the seal. The valve can be locked and sealed in open position by removing the seal plug and device 70, turning the plug, slipping the device 70 onto the valve stem with faces 77 and 78 between stop faces 64 and 66 and providing a new seal plug in apertures 74 and 75. An important result of this construction is that the lubricant screw 38 is locked when the valve is locked, to prevent unauthorized tampering.

I have therefore provided a novel lubricated plug valve assembly wherein the valve stem is tightly sealed against the ingress of water, dirt, etc. and against the egress of lubricant or line fluid under pressure, particularly along the valve stem, and the parts are readily disassembled and assembled without deforming the sealing members or destroying them, so that they can readily be used over and over again.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly, a casing having a fluid passage therethrough intersected by a plug bore, a rotatable plug in said bore, a valve stem for the plug projecting through said casing, a lubricant receiving bore in said stem; a screw rotatable in said bore and having a head projecting from said stem, spaced fixed stops on said casing, a stop member fixed on said stem and adapted to contact one or the other of said stops in different operative positions of rotation of the plug, means for locking the plug in fully open or closed positions comprising a member non-rotatably but removably mounted on said stem and having a part interposed between the stop member and that one of said stops not contacted by said stop member, and means interlocking said head and said locking member.

2. In a plug valve assembly, a body having a through passage intersected by a bore, a rotatable plug in said bore and having a stem projecting outwardly of said body, coacting means on the plug stem and said body for limiting angular movement of said valve in both directions, a lubricant bore in said stem, a lubricant feed screw in said bore and means non-rotatably but removably mounted on said stem having a first part operably connected to said coacting means and a second part secured to said screw for locking both said plug and said feed screw against angular movement in open and closed positions of the plug.

3. In a lubricated plug valve, a valve body, a valve plug rotatable in the body and having an operating stem projecting from the body, sealing means between the stem and body, means providing a lubricant reservoir in the valve stem and conduits to supply lubricant to the valve plug seating surfaces in the body, a lubricant feed member mounted in said stem and shiftable for displacing lubricant from the reservoir into said conduits, means removably mounted on said valve stem for locking said valve plug in fully open or closed positions, and means interconnecting said locking means and the lubricant feed member for locking the latter when the valve is locked.

4. In a plug valve assembly, a body having a through passage intersected by a bore, a rotatable plug in said bore and having a stem projecting outwardly of said body, two stops on said body disposed substantially 180° apart, a stop collar non-rotatably mounted on said valve stem and having a side flange projecting into the space between said two stops, stop faces on opposite ends of said flange disposed substantially 90° apart, one of said faces being engaged with one of said stops in the fully open and closed positions of the valve, and a plug locking member non-rotatably mounted on said valve stem, said plug locking member having a flange provided with end faces 90° apart adapted to fit between one of said stops and one of said faces on the stop collar flange in both open and closed positions of the valve plug.

5. In a plug valve assembly, a body having a through passage intersected by a bore, a plug rotatably mounted in said bore and having a passage therethrough adapted to be aligned with said body passage in the open position of the valve assembly, a stem for said plug projecting outwardly of said body, two fixed circumferentially spaced stop projections upstanding from said body, a stop collar non-rotatably mounted on said valve stem outwardly of said body and having an integral segmental side flange projecting into the space between said stop projections, stop faces on opposite ends of said flange adapted to engage one of said stop projections in the fully open and fully closed limit positions of rotation of said valve plug, the stop face which is not in contact with said one stop projection in a limit position of the valve plug being spaced substantially 90° from the other of said stop projections and a locking member non-rotatably mounted on said valve stem and having a segmental flange projecting into and filling the space between the stop projection which is not in contact with the stop collar flange and the adjacent collar flange in both open and closed position of the plug.

References Cited in the file of this patent

UNITED STATES PATENTS

| | | |
|---|---|---|
| 908,717 | Westwater | Jan. 5, 1909 |
| 1,095,139 | Bennett | Apr. 28, 1914 |
| 1,099,280 | Connolly | June 9, 1914 |
| 1,150,305 | Shedd | Aug. 17, 1915 |
| 1,469,762 | Nordstrom | Oct. 2, 1923 |
| 1,473,775 | Leech | Nov. 13, 1923 |
| 1,590,032 | Jauch | June 22, 1926 |
| 1,769,900 | Olson | July 1, 1930 |
| 1,877,529 | Platt | Sept. 13, 1932 |
| 1,898,899 | Rowley | Feb. 21, 1933 |
| 1,926,450 | MacGregor | Sept. 12, 1933 |
| 2,047,752 | Specht | July 14, 1936 |
| 2,077,997 | Hedene | Apr. 20, 1937 |
| 2,147,851 | Mallon | Feb. 21, 1939 |
| 2,253,643 | Mueller | Aug. 26, 1941 |

FOREIGN PATENTS

| | | |
|---|---|---|
| 880,352 | France | Mar. 24, 1943 |